US009239693B2

(12) United States Patent
Nagarajan

(10) Patent No.: US 9,239,693 B2
(45) Date of Patent: Jan. 19, 2016

(54) AUTOMATICALLY PRINTING ONLY PAGES CONTAINING BLANK SIGNATURE LINES

(71) Applicant: Xerox Corporation, Norwalk, CT (US)

(72) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/278,815

(22) Filed: May 15, 2014

(65) Prior Publication Data

US 2015/0331644 A1    Nov. 19, 2015

(51) Int. Cl.
| | | |
|---|---|---|
| G06F 3/12 | (2006.01) | |
| G06K 15/02 | (2006.01) | |
| G06K 15/00 | (2006.01) | |
| G06K 9/03 | (2006.01) | |
| G06F 17/24 | (2006.01) | |
| G06F 17/21 | (2006.01) | |

(52) U.S. Cl.
CPC ............ *G06F 3/1219* (2013.01); *G06F 3/1204* (2013.01); *G06F 3/1258* (2013.01); *G06F 3/1275* (2013.01); *G06K 15/00* (2013.01); *G06K 15/1822* (2013.01); *G06K 15/1856* (2013.01); *G06F 17/218* (2013.01); *G06F 17/243* (2013.01); *G06K 9/036* (2013.01)

(58) Field of Classification Search
None
See application file for complete search history.

(56) References Cited

U.S. PATENT DOCUMENTS

| | | | |
|---|---|---|---|
| 5,119,433 A | 6/1992 | Will | |
| 5,134,669 A | 7/1992 | Keogh et al. | |
| 5,676,339 A * | 10/1997 | Simon | 248/56 |
| 6,031,625 A | 2/2000 | Sherman et al. | |
| 6,483,599 B1 | 11/2002 | Woodman et al. | |
| 6,883,980 B2 | 4/2005 | Guddanti | |
| 6,988,839 B1 | 1/2006 | Yu | |
| 7,090,417 B2 | 8/2006 | Roztocil et al. | |
| 7,791,751 B2 | 9/2010 | Lofthus et al. | |
| 8,542,889 B2 | 9/2013 | Sarnoff | |
| 8,636,224 B2 | 1/2014 | Wang | |
| 2002/0051201 A1* | 5/2002 | Winter et al. | 358/1.16 |
| 2005/0200923 A1* | 9/2005 | Shimada et al. | 358/537 |
| 2006/0081696 A1* | 4/2006 | Sakurai et al. | 235/375 |
| 2010/0235727 A1 | 9/2010 | Ashton et al. | |
| 2011/0157658 A1* | 6/2011 | Yokomizo | 358/474 |
| 2012/0062953 A1* | 3/2012 | Silverbrook et al. | 358/1.15 |
| 2013/0063745 A1* | 3/2013 | Tecu et al. | 358/1.13 |

* cited by examiner

*Primary Examiner* — Miya J Cato

(74) *Attorney, Agent, or Firm* — Gibb & Riley, LLC

(57) ABSTRACT

Methods and devices receive, into a graphical user interface of a computerized device, an instruction to print an item. Such methods and devices automatically identify one or more blank signature lines within the item using a processor of the computerized device, and automatically output an option on the graphical user interface to print only one or more pages of the item that contain the blank signature lines. Upon selection of the option through the graphical user interface, these methods and devices automatically print only the pages of the item containing the blank signature lines using a printer operatively connected to the computerized device.

16 Claims, 4 Drawing Sheets

AUTOMATICALLY PRINTING ONLY PAGES CONTAINING BLANK SIGNATURE LINES

BACKGROUND

Systems and methods herein generally relate to printing devices and systems, and more particularly to methods and systems that automatically print only pages of a document containing blank signature lines.

There are many workflows today that can benefit from just printing the signature page of a multipage document, have it signed and scanned back to append with the document before sending it out to next person on the signature cycle. For example, one workflow can include review processes for documents that instruct business managers, purchasing managers, and legal personnel to all sign the same document. Many legal workflows present similar scenarios. In many environments, even though reviewing of documents happens electronically, final acknowledgement and approval still require actual signatures on paper documents.

SUMMARY

Exemplary methods herein receive, into a graphical user interface of a computerized device, an instruction to print an item, such as an electronic document, electronic spreadsheet, electronic graphical item, electronic photograph, etc. Such methods automatically identify one or more blank signature lines (e.g., a full signature line, a partial signature line, an initial line, etc.) within the item using a processor of the computerized device. For example, these methods can automatically match patterns of lines and characters within the item to character patterns previously determined to be a blank signature line. Thus, in one example, a solid line (or underlined spaces) centered over a discrete amount of text (e.g. three words or two words separated by an initial, commonly associated with the format used for a person's name) that is separated by a sufficient amount of white space from other text within the item can comprise a pattern of characters within the item that matches a character pattern that has previously been determined to be a blank signature line. Such methods can also recognize any other signature pattern that is appropriate to each user that deploys this automated workflow.

Further, such methods can automatically output an option on the graphical user interface to print only one or more pages of the item that contain the blank signature lines, and such blank signature lines lack markings that are characteristic of handwriting.

Upon selection of the option through the graphical user interface, these methods automatically print only the pages of the item containing the blank signature lines using a printer operatively connected to the computerized device.

The user may immediately place a signature (or other similar human (non-machine) markings) in or near the blank signature lines and scan such pages using an optical scanner (which is commonly included on most modern printing devices). Therefore, in response to the methods printing only the pages containing blank signature lines, these methods may receive a scanned image of printed versions of the pages of the item, where the scanned image is different than the printed pages because the scanned image now includes the human-made, non-machine markings in areas of close proximity to the blank signature lines. When this occurs, these methods automatically create a new electronic document (second item) by substituting the scanned image for the pages of the item containing the blank signature lines. Further, the instruction to print the item are generally received from a sender, and the method further automatically outputs the second item to the sender once the scanned image is received and the second item is created. In some instances the document could be forwarded to another recipient who may also need sign, for example where documents that require multiple levels of approval. Thus, these methods can automatically forward the second item (once it is automatically created) to the next recipient for obtaining the signature of the next recipient.

Computerized devices herein include, among other items, a processor, a printer operatively (meaning directly or indirectly) connected to the processor, a graphical user interface operatively connected to the processor, etc. The graphical user interface receives an instruction to print an item, and the processor automatically identifies one or more blank signature lines within the item. The graphical user interface then automatically outputs an option to print only one or more pages of the item that contain the blank signature lines. Upon selection of the option through the graphical user interface, the printer automatically prints only the pages of the item that contain the blank signature lines.

Such devices can also include a scanner operatively connected to the processor. If the user signs they printed pages and uses the scanner to scan back in the signed printed pages, the processor will receive, from the scanner, a scanned image of printed versions of the pages of the item. The scanned image will now include human-made, non-machine markings in the area around the blank signature lines. Therefore, the processor automatically creates a second item by substituting the scanned image for the pages of the item containing the blank signature lines, and can automatically output the second item to the sender who originally sent the instruction to print the item. Alternatively, these devices can forward the partially signed document to the next recipient who needs to sign, where documents require multiple levels of approval.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, even though reviewing of documents happens electronically, final acknowledgement and approval often still require actual signatures on paper documents. Printing an entire long document to obtain a signature on only one or a few pages of the document is wasteful of printing resources. This is especially true if signatures are required of many people in succession, and each person prints a full version of the document for signature before forwarding the document to the next signing individual.

Therefore, the systems and methods herein provide a print workflow that enables automatic printing of selective pages in a document by detecting the one or more signature pages in a multipage document. Upon detection of the signature pages, only the signature pages are printed. This helps the admin/user to avoid printing any unwanted pages (green initiative).

Further, if the user desires to only print the signature pages, the user must manually to find the signature pages and then must manually identify the individual pages that should be printed, which is error-prone and time-consuming. The methods and devices herein automate the process identifying the signature pages, printing only the signature pages, and recombining the scanned signature pages (after signature) with the original document. In doing so, the methods and devices herein safe printing resources, reduce tedious user activity, and eliminate user error from the process.

Figure 1:
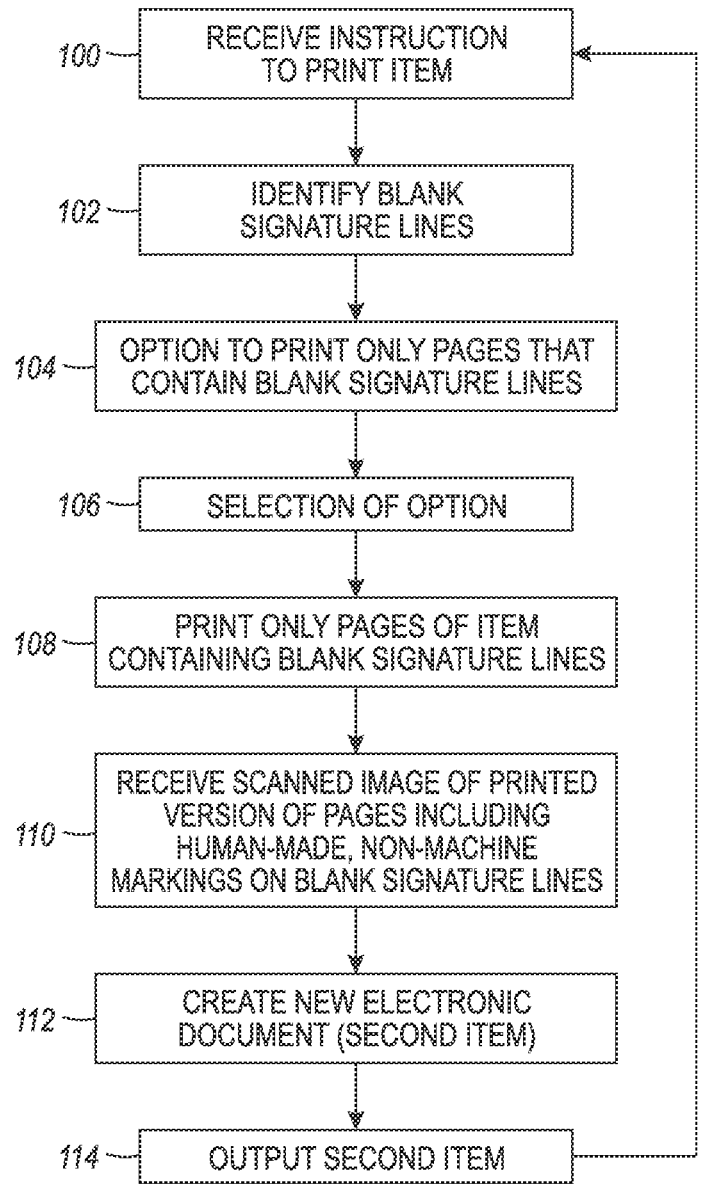
FIG. 1 is a flow diagram of various methods herein.

FIG. 1 is flowchart illustrating exemplary methods herein. In item 100, these methods receive, into a graphical user interface of a computerized device, an instruction to print an item, such as an electronic document, electronic spreadsheet, electronic graphical item, electronic photograph, etc. In item 102, such methods automatically identify one or more blank signature lines (e.g., a full signature line, a partial signature line, an initial line, etc.) within the item using a processor of the computerized device. For example, these methods can automatically match patterns of lines and characters within the item to character patterns previously determined to be a blank signature line. Thus, in one example, a solid line (or underlined spaces) centered over a discrete amount of text (e.g. three words or two words separated by an initial, commonly associated with the format used for a person's name) that is separated by a sufficient amount of white space from other text within the item can comprise a pattern of characters within the item that matches a character pattern that has previously been determined to be a blank signature line.

Further, in item 104, such methods can automatically output an option on the graphical user interface to print only one or more pages of the item that contain the blank signature lines. Upon selection of the option through the graphical user interface in item 106, these methods automatically print only the pages of the item containing the blank signature lines using a printer operatively connected to the computerized device in item 108.

The user may immediately place a signature (or other similar human (non-machine) markings) in or near the blank signature lines and scan such pages using an optical scanner (which is commonly included on most modern printing devices). Therefore, in response to the methods printing only the pages containing blank signature lines in item 108, these methods may, in item 110 receive a scanned image of printed versions of the pages of the item, where the scanned image is different than the printed pages because the scanned image now includes the human-made, non-machine markings in areas of close proximity to the blank signature lines. When this occurs, in item 112, these methods automatically create a new electronic document (second item) by substituting the scanned image for the pages of the item containing the blank signature lines. Further, the instruction to print the item are generally received from a sender, and the method further automatically outputs the second item to the sender in item 114 once the scanned image is received (110) and the second item is created (112).

Additionally, as shown by the return arrow from item 114 to item 100, once a first individual has signed one of the many signature lines, the partially executed document created in item 112 can be forwarded to the next individual for signature, who would then begin the process for providing their signature by providing an instruction to print the item (to item 100). Therefore, the methods herein can create many intermediary partially executed electronic documents as the document is being forwarded from the most recent signing individual to next signing individual. When doing so, if there are multiple pages of signature lines in the document, when all available signature lines on a specific page have been completed (and there are no further remaining blank lines on a given page that contains signature lines) the methods herein do not print pages where all available signature lines on a specific page have been completed. Therefore, the methods herein can loop through the process multiple times by printing only pages having at least one blank signature line, inserting the scanned signature image into the document, forwarding the document to the next signing individual, and repeating the process as many times as is needed until all available signature lines have some form of handwritten signature (were there are no additional remaining individuals on the list of individuals available to sign the document).

For example, in item 102, when these methods are identifying blank signature lines, they match patterns of lines and characters within the item to character patterns previously determined to be a blank signature line and look for separation by a sufficient amount of white space from other text. However, if there are curved, non-linear markings characteristic of handwriting within such white space, the methods and systems herein note that one or more of the identified signature lines have been previously signed. If all such available signature lines include markings consistent with handwriting, that page can be excluded from the printing process in item 108.

With respect to a signature line or signature block is a signature line and associated text, such as the signer's identification information. The methods and devices herein can apply a first sub-set of heuristics in order to identify the electronic document within the print job as a specific type of document (e.g., a letter or contract) requiring a signature, based on known text and/or formatting characteristics of one or more initial components typically found on the first page of that specific type of document. If the electronic document is a specific type of document that requires a signature, then the methods and devices herein can apply the second sub-set of heuristics to identify the signature page within the electronic document, based on known text and/or formatting characteristics of one or more final components typically found on the signature page in that specific type of document.

For example, the methods and systems herein can apply the first sub-set of heuristics in order to identify the electronic document within the print job as a letter, based on known text and/or formatting characteristics of, for example, salutations typically found on the first page of letters. That is, the first page of a letter typically has a salutation and such salutations have known text characteristics (e.g., "Dear [Name],"; "Hi [Name],"; "Dearest [Name],"; "To whom it may concern,"; etc.,) and also known formatting characteristics (e.g., capitalized, placement at the left margin, etc.) within letters. A list of such salutations and formatting for such salutations can be contained in the first sub-set of heuristics stored in the memory and application of the first sub-set of heuristics can comprise comparing the text data on the first page of the electronic document to the list of salutations and, if a match is found between a phrase within the text data and one of the salutations on the list and (optionally for a more accurate identification) if that phrase has the required formatting (e.g., capitalization and placement), then the electronic document can be identified as a letter.

The use of salutations, as described above, is not intended to be limiting. The first pages of letters also typically have other initial components (e.g., the letter head of the sender, the address of the addressee, a regarding or attention line, etc.) and these other initial components also have known text and/or formatting characteristics. Thus, the comparison of the text data on the first page of the electronic document to the known text and/or formatting characteristics of these other initial components can, additionally or alternatively, be used to identify the electronic document as a letter.

If the electronic document is a letter, then the methods and devices herein can apply the second sub-set of heuristics to identify the signature page of the letter from amongst all pages in the letter, based on known text and/or formatting characteristics of, for example, valedictions (also referred to herein as complimentary closings) typically found on the signature page of letters. That is, the signature page of a letter typically has a valediction and such valedictions have known text characteristics (e.g., "Sincerely,"; "Yours truly,"; "Respectfully,"; "Best Regards,"; etc.,) and also known formatting characteristics (e.g., capitalized, placement along the centerline of the document, etc.). A list of such valedictions and formatting for such valedictions can be contained in the second sub-set of heuristics stored in the memory and application of the second sub-set of heuristics can comprise comparing the text data on all pages of the electronic document to the list of valedictions and, if a match is found between a phrase within the text data and one of the valedictions on the list and (optionally for a more accurate identification) if that phrase has the required formatting (e.g., capitalization and placement), then the page on which the phrase is found can be identified as the signature page.

The use of valedictions, as described above, is not intended to be limiting. The signature page of a letter also typically has other final components (e.g., a signature block following the valediction, an enclosure indicator, a copies indicator, etc.) (also referred to herein as letter signature page components) and these other letter signature page components also have known text and/or formatting characteristics. For purpose of this disclosure, the signature block refers to the space following the valediction within which the sender can sign a letter as well as the sender's identification information (e.g., name, address, telephone number(s), email address and/or any other identification information). The comparison of the text data on all the pages of the electronic document to the known text and/or formatting characteristics of these other letter signature page components can, additionally or alternatively, be used to identify the signature page of the letter.

It should be noted that, if a determination is made that the electronic document is not a type of document that requires a signature (e.g., not a letter or contract) or does not contain a blank signature line, then the processor can automatically release the print job to the printing device for printing. That is, when the electronic document is determined to be devoid of a blank signature, the processor can automatically release the print job to the printing device for printing.

Figure 2:
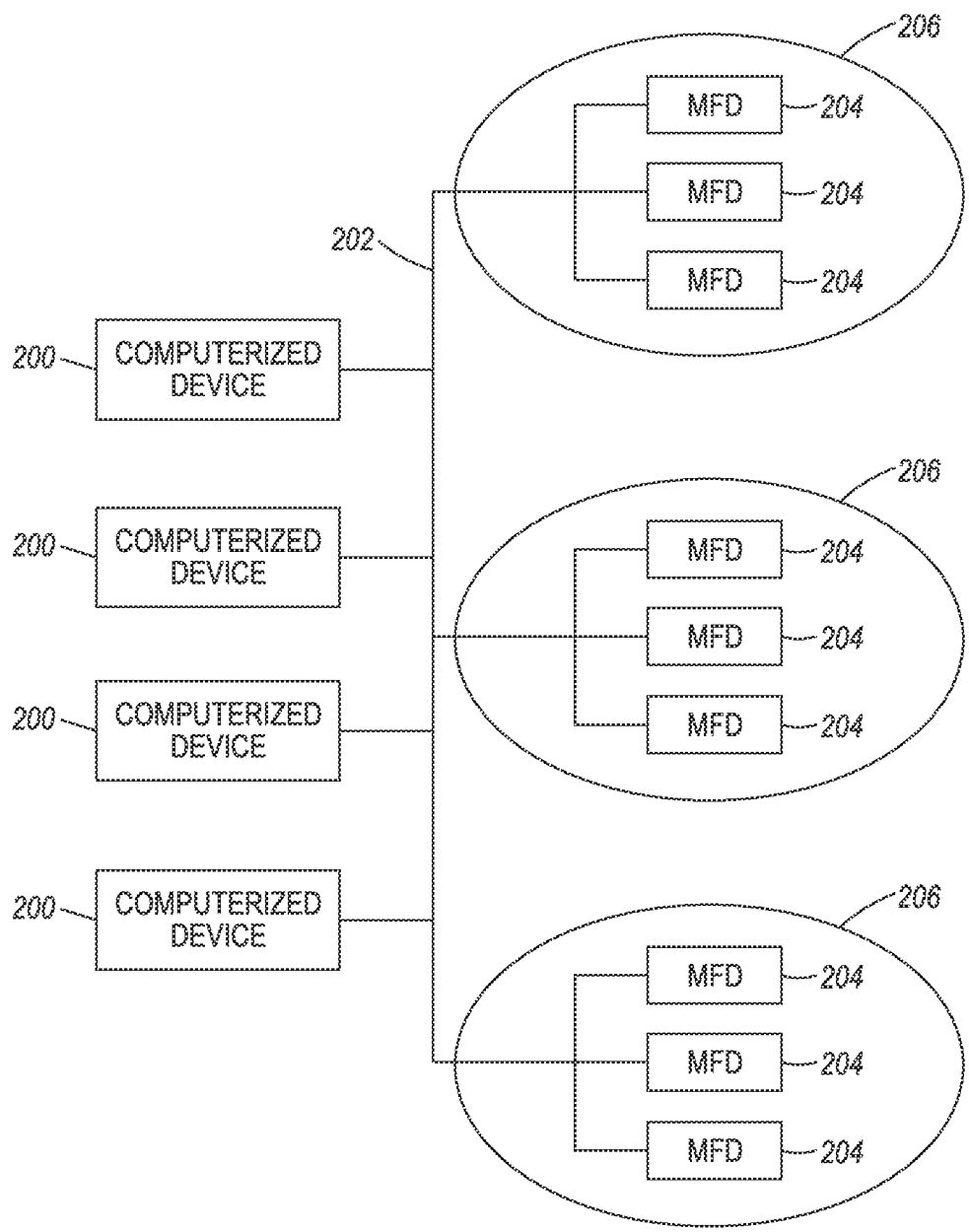
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
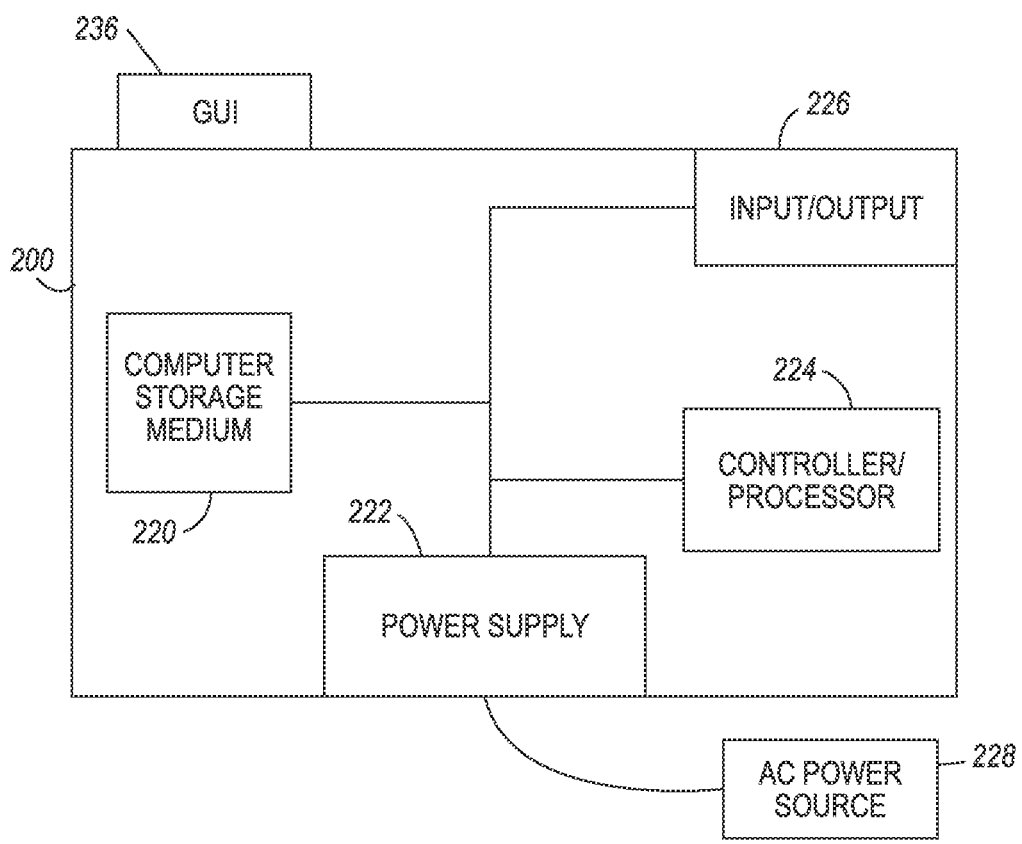
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 4:
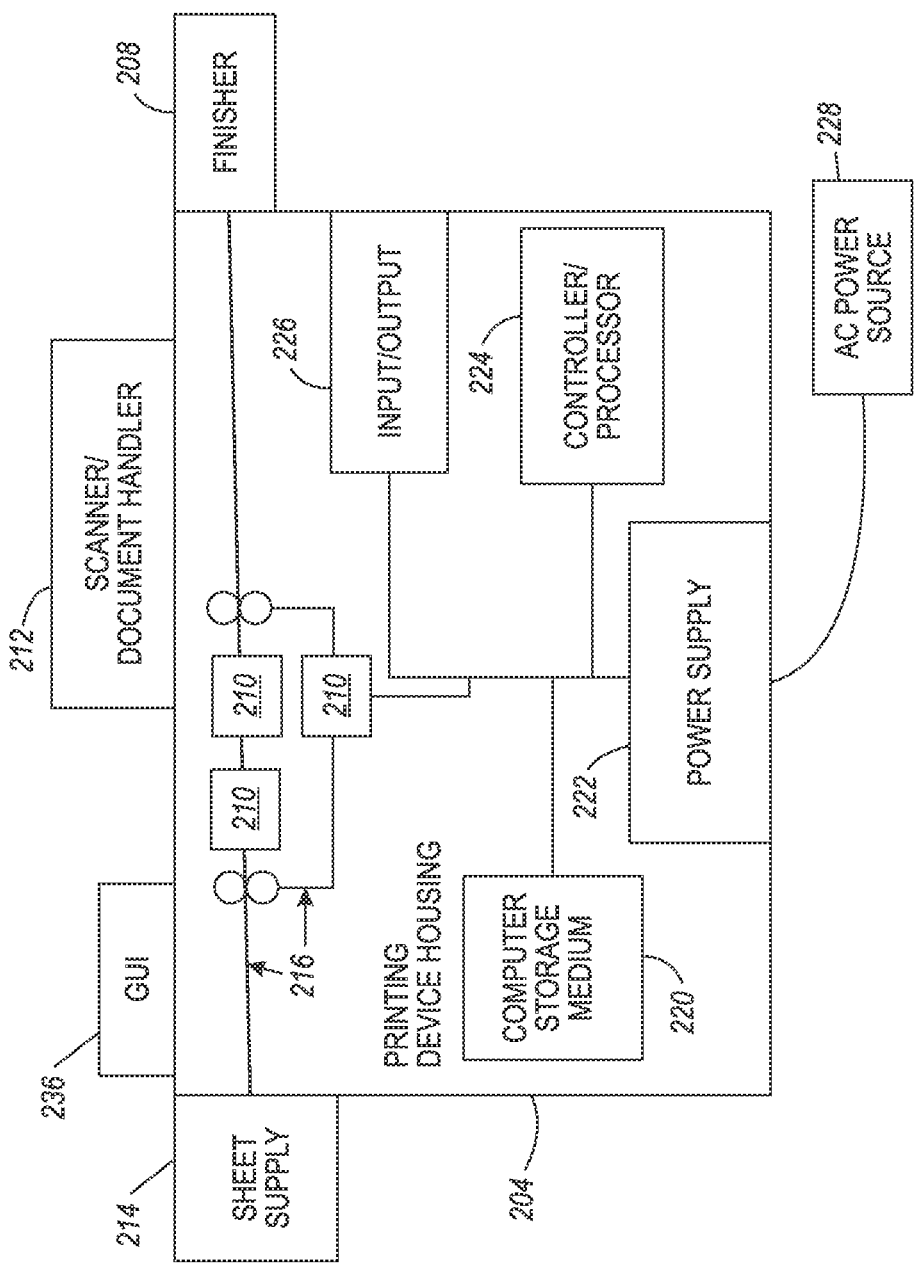
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, computerized devices herein include, among other items, a processor 224, a printer 204 operatively (meaning directly or indirectly) connected to the processor 224, a graphical user interface operatively connected to the processor 224, etc. The graphical user interface receives an instruction to print an item, and the processor 224 automatically identifies one or more blank signature lines within the item. The graphical user interface then automatically outputs an option to print only one or more pages of the item that contain the blank signature lines. Upon selection of the option through the graphical user interface, the printer 204 automatically prints only the pages of the item that contain the blank signature lines.

Such devices can also include a scanner 212 operatively connected to the processor 224. If the user signs they printed pages and uses the scanner 212 to scan back in the signed printed pages, the processor 224 will receive, from the scanner 212, a scanned image of printed versions of the pages of the item. The scanned image will now include human-made, non-machine markings in the area around the blank signature lines. Therefore, the processor 224 automatically creates a second item by substituting the scanned image for the pages of the item containing the blank signature lines, and can automatically output the second item to the sender who originally sent the instruction to print the item.

As would be understood by those ordinarily skilled in the art, the printing device 204 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a computerized device, an instruction to print an item comprising pages;
   automatically identifying whether at least one of said pages comprises one or more blank signature lines by automatically matching patterns within said item to patterns previously determined as being a blank signature line using a processor of said computerized device; and
   automatically printing only one or more pages of said item containing said blank signature lines, and avoiding printing other ones of said pages not containing said blank signature lines, using a printer operatively connected to said computerized device.

2. The method according to claim 1, further comprising:
   receiving, in response to said printing, a scanned image of printed versions of said pages of said item, said scanned image including human-made, non-machine markings in an area of said blank signature lines; and
   automatically creating a second item by substituting said scanned image for said pages of said item containing said blank signature lines.

3. The method according to claim 2, further comprising automatically forwarding said second item to a next recipient for obtaining a signature of said next recipient.

4. The method according to claim 1, said blank signature lines lacking markings characteristic of handwriting.

5. A method comprising:
   receiving, into a graphical user interface of a computerized device, an instruction to print a partially executed document comprising pages, said partially executed document comprising at least one image of a handwritten signature on at least one of said pages;
   automatically identifying whether at least one of said pages comprises one or more blank signature lines by automatically matching patterns within said partially executed document to patterns previously determined as being a blank signature line using a processor of said computerized device;
   automatically outputting an option on said graphical user interface to print only one or more pages of said partially executed document containing said blank signature lines; and
   upon selection of said option through said graphical user interface, automatically printing only said pages of said partially executed document containing said blank signature lines, and avoiding printing other ones of said pages of said partially executed document not containing said blank signature lines, using a printer operatively connected to said computerized device.

6. The method according to claim 5, further comprising:
   receiving, in response to said printing, a scanned image of printed versions of said pages of said partially executed document, said scanned image including human-made, non-machine markings in an area of said blank signature lines; and
   automatically creating a second partially executed document by substituting said scanned image for said pages of said partially executed document containing said blank signature lines.

7. The method according to claim 6, further comprising automatically forwarding said second partially executed document to a next recipient for obtaining a signature of said next recipient.

8. The method according to claim 5, said blank signature lines lacking markings characteristic of handwriting.

9. A computerized device comprising:
   a processor; and
   a printer operatively connected to said processor,
   said processor receiving an instruction to print an item comprising pages,
   said processor automatically identifying whether at least one of said pages comprises one or more blank signature lines by automatically matching patterns within said item to patterns previously determined as being a blank signature line, and said printer automatically printing only pages of said item containing said blank signature lines, and avoiding printing other ones of said pages not containing said blank signature lines.

10. The computerized device according to claim 9, further comprising a scanner operatively connected to said processor,
said processor receiving, from said scanner, a scanned image of printed versions of said pages of said item, said scanned image including human-made, non-machine markings in an area of said blank signature lines; and
said processor automatically creating a second item by substituting said scanned image for said pages of said item containing said blank signature lines.

11. The computerized device according to claim 10, said processor automatically forwarding said second item to a next recipient for obtaining a signature of said next recipient.

12. The computerized device according to claim 9, said blank signature lines lacking markings characteristic of handwriting.

13. A computerized device comprising:
a processor;
a printer operatively connected to said processor; and
a graphical user interface operatively connected to said processor,
said graphical user interface receiving an instruction to print a partially executed document comprising pages, said partially executed document comprising at least one image of a handwritten signature on at least one of said pages,
said processor automatically identifying whether at least one of said pages comprises one or more blank signature lines by automatically matching patterns within said partially executed document to patterns previously determined as being a blank signature line,
said graphical user interface automatically outputting an option to print only one or more pages of said partially executed document containing said blank signature lines, and
upon selection of said option through said graphical user interface, said printer automatically printing only said pages of said partially executed document containing said blank signature lines, and avoiding printing other ones of said pages of said partially executed document not containing said blank signature lines.

14. The computerized device according to claim 13, further comprising a scanner operatively connected to said processor,
said processor receiving, from said scanner, a scanned image of printed versions of said pages of said partially executed document, said scanned image including human-made, non-machine markings in an area of said blank signature lines; and
said processor automatically creating a second partially executed document by substituting said scanned image for said pages of said partially executed document containing said blank signature lines.

15. The computerized device according to claim 14, said processor automatically forwarding said second partially executed document to a next recipient for obtaining a signature of said next recipient.

16. The computerized device according to claim 13, said blank signature lines lacking markings characteristic of handwriting.

* * * * *